US008467713B2

(12) United States Patent
Finn (10) Patent No.: US 8,467,713 B2
(45) Date of Patent: Jun. 18, 2013

(54) HYBRID READING MATERIALS AND METHODS FOR MENTALLY INVESTING READERS IN READING MATERIALS

(76) Inventor: Marilyn Finn, Portland, OR (US)

( * ) Notice: Subject to any disclaimer, the term of this patent is extended or adjusted under 35 U.S.C. 154(b) by 1378 days.

(21) Appl. No.: 11/982,522

(22) Filed: Nov. 1, 2007

(65) Prior Publication Data

US 2009/0117528 A1    May 7, 2009

(51) Int. Cl.
    *G09B 5/00* (2006.01)
(52) U.S. Cl.
    USPC .................................. 434/317; 434/308
(58) Field of Classification Search
    USPC .............. 434/307 R, 308, 317, 365; 715/201, 715/200
    See application file for complete search history.

(56) References Cited

U.S. PATENT DOCUMENTS

| | | | | |
|---|---|---|---|---|
| 5,263,865 | A * | 11/1993 | Zipf | 434/309 |
| 5,963,916 | A | 10/1999 | Kaplan | |
| 6,633,741 | B1 | 10/2003 | Posa et al. | 434/317 |
| 6,750,978 | B1 * | 6/2004 | Marggraff et al. | 358/1.12 |
| 6,961,895 | B1 * | 11/2005 | Beran et al. | 715/203 |
| 7,020,663 | B2 * | 3/2006 | Hay et al. | 434/317 |
| 7,516,073 | B2 * | 4/2009 | Kodama | 704/270 |
| 8,073,695 | B1 * | 12/2011 | Hendricks et al. | 704/260 |
| 2002/0103818 | A1 * | 8/2002 | Amberden | 707/205 |
| 2003/0013073 | A1 * | 1/2003 | Duncan et al. | 434/317 |
| 2003/0117341 | A1 | 6/2003 | Browning | |
| 2004/0117728 | A1 | 6/2004 | Gromer | |
| 2005/0022113 | A1 * | 1/2005 | Hanlon | 715/511 |
| 2005/0040639 | A1 | 2/2005 | Deadwyler | |
| 2005/0069849 | A1 * | 3/2005 | McKinney et al. | 434/178 |
| 2006/0100924 | A1 | 5/2006 | Tevanian, Jr. | |
| 2007/0072162 | A1 | 3/2007 | Honadel | |
| 2007/0079383 | A1 | 4/2007 | Gopalakrishnan | |
| 2007/0248938 | A1 * | 10/2007 | Ronald | 434/178 |
| 2008/0114599 | A1 * | 5/2008 | Slotznick et al. | 704/260 |
| 2008/0228590 | A1 * | 9/2008 | Johnson | 705/26 |

OTHER PUBLICATIONS

The Oregonian, "Read any good, uh, cell phones?" Nov. 19, 2007, pp. E1-E2.
Martha Brockenbrough, Are Kids' Books Boring?, Article published online at http://momshomeroom.msn.com, publication date unknown, but first accessed by applicatant in Jun. 2009.
The Associated Press, Sony Unveils Wireless e-Reader, web page, Aug. 25, 2009, published online at http://www.oregonlive.com/business/index.ssf/2009/08/sony_unveils_wireless_ereader.html.

* cited by examiner

*Primary Examiner* — Xuan Thai
*Assistant Examiner* — Peter Egloff
(74) *Attorney, Agent, or Firm* — Mohr Intellectual Property Law Solutions, PC (57) ABSTRACT

Hybrid reading materials and methods for mentally investing readers in reading materials. Hybrid reading materials include text reciting written subject matter adapted to be read visually and an audio source operatively coupled to the text, the audio source including a memory device configured to store spoken presentation data, the spoken presentation data supplementing the text and being distinct from the written subject matter. Methods for mentally investing a reader in a reading material include providing a reader with a summary document which summarizes aspects of the reading material and providing the reader with a spoken presentation of subject matter related to the reading material.

12 Claims, 9 Drawing Sheets

Book Starters Reading Guide – No. 1

40 ↘         41 ↘ The Friendship
by

Mildred D. Taylor

42 → - Place: Rural Mississippi. Many blacks and whites in the community are tenant farmers, which means they don't own their farms. Some of the tenant farmers are "sharecroppers," because they give part of their crops (usually cotton) to the landlord, instead of rent.

43 → - Time: 1933. America is in an economic depression. Lots of people are poor and prices paid for crops are low. It is also 68 years after the end of the Civil War between the North and the South and the end of slavery. It is a difficult time to be an African American, especially in the South.

44 → - Setting: The Wallace Store, owned by a white man, is located at a rural crossroads, where two country roads cross. Many of the customers "charge" their purchases, because they can't afford to pay until their crops are harvested.

45 → - Narrator: Cassie Logan, 9 years old, who is a customer at the store with her three brothers, tells the story.

46 → - Characters:    48 ↙ ↘

Logan Family (black)
49 →    - Stacey – 12
- Cassie – 9
- Christopher-John – 7
47 →    - Little Man – 6
- Mama
- Pappa
- Big Ma – grandmother "Aunt" Callie Jackson – elderly black neighbor "Roosevelt" – President Franklin D. Roosevelt 49 → Mr. Tom Bee – elderly black Farmer

Wallace Family (white)
- John – father
- Dewberry – son
- Thurston – son
- Kaleb – son

Simms Family (white)
- Charlie – father
- R.W. – teenage son
- Melvin – teenage son
- Jeremy – son (about 12)

Two other customers (white)

Fig.3

40 ↘  41 ↘ The Secret Garden
by
Frances Hodgson Burnett

43 → • Time: not given, published 1911.

42 → • Place: India, during the time when it was a crown colony of England and part of the British Empire. English army officers lived in India with their families.

46 → • Lennox household:
    - Captain Lennox - father
    - Mrs. Lennox – mother (memsahib)
49 →    - Mary Lennox – 9 (missie sahib)

47 →    - many Indian servants
    - Saidie – nursemaid (Ayah)

• English Officers:
    - young officer
    - Barney
    - Col. McGrew
    - officer's wife

• Crawford household:
    - Mr. Crawford – clergyman
    - Mrs. Crawford – wife
    - Basil – son - 7

42 → • Place: Yorkshire, in northern England, on a desolate moorland.

• Misselthwaite Manor:
46 →    - Archibald Craven – Mary's uncle
    - Mrs. Craven – Capt. Lennox's sister
    - Dr. Craven – Archibald's cousin
    - Colin – 10 ("the Rajah")

47 →    - many servants
    - Mrs. Medlock - housekeeper
    - Pitcher – Archibald's servant
49 →    - Martha Sowerby – housemaid
    - Ben Weatherstaff – gardener
    - robin
    - nurse
    - Mr. Roach – head gardener

• Sowerby Cottage:
    - Mrs. Sowerby – mother of 12
    - Dickon - 12

- Dickon's animals:
      - Captain – fox
      - Soot – crow (rook)
      - Nut and Shell – squirrels
      - Jump – pony
      - lamb

Portland's Own Cinderfella Story
by
Erin Hoover Barnett (The Oregonian, July 28, 2007, p. D1)

43 → • Time: Summer, 2007

42 → • Place: St. Johns, Portland, Oregon

50 → • Topic: How a boys' Junior Baseball team of "leftovers"—and an unlikely coach—won the state championship.

47 → • Coaching Staff:

49 →
- John Goncalves – head coach, 62
- Ed Langlois – assistant coach

47 → • North Portland No. 7 team:

49 →
- Elijah Boozer – batter, 9
- Asher Finkelstein –
- Jesse Goncalves – pitcher, 10
- Eric Gregg – catcher
- Andy Langlois – pitcher and first base
- Anthony Lewis – third base and left field, 10
- Marco Poot-McDonald – center field
- Deion Robertson – shortstop 47 → • Parents:

- Clarke Boozer
- Andy Lewis

52 → • 8/1/07 Letter to the Editor, "Young team one to admire," p. C7

- Brian Windheim – Coach, Sherwood Stealers baseball team

HYBRID READING MATERIALS AND METHODS FOR MENTALLY INVESTING READERS IN READING MATERIALS

BACKGROUND

As the U.S. leaves the industrial age and a manufacturing economy and enters the information age and a service economy based on knowledge, children need high-level reading skills more than ever to succeed in this new global economy. They need to become independent readers who want to read, so they can learn for the rest of their lives.

But, ironically, as more emphasis is put on testing in the schools, children are reading less outside of school. We have reached a point where young adults in their 20s read fewer newspapers than their parents did and fewer books than young adults in a similar age group read just two decades ago.

Of course, there is a group of self-motivated readers, who will succeed in school and in their careers, in spite of all of the drilling and testing. They were lucky enough to have parents who read to them (and with them) and took them to libraries, basically instilling in them a love of stories before they even learned to read. (See chart below.)

But, even among this group, the desire for recreational reading can disappear, if no time is provided in school for teachers to read aloud to the class, for class visits to the school library for story time, and for "free time" in class so students can choose books on their own for silent reading. Unfortunately, all of these important activities are being eliminated in many schools across the country, so that schools can spend all of their time preparing students for tests.

This excessive emphasis on testing and basic reading skills, with no time for the enjoyment of reading, eventually leads to a diminished return on the investment of time. It is like the child who learns to play tennis at the age of four. After years of long lessons and intense drills, preparation for weekly tournaments, and never playing for fun, the parents are disappointed when the child "burns out" as a teenager and never becomes the professional player they hoped for. In fact, he may put down his racquet and never play a game again.

Meanwhile, as students advance in school and the stakes get higher, the emphasis on testing will cause many students to cheat for a grade, instead of reading a book. For example, they will look for study guides on the internet that summarize and explain the book in detail to answer questions or write "analytical" essays. Eventually, instead of seeing a book as a source of enjoyment that slowly reveals itself to a reader, they will see it as a collection of "facts" that they have to search for answers—if they actually look at the book itself, instead of a cheat sheet. They end up missing the whole point of reading.

The following chart will display the differences between the child who grows up to be a life-long reader and the child who avoids reading as much as possible.

TABLE 1

Comparison of reading introduction methods

| Life-long readers | Reading avoiders |
|---|---|
| Parents read to child from early months. Results for the child: Enjoys stories | Parents don't read to child. Results for the child: May believe stories are limited to TV shows |
| Enters school with large vocabulary Can "hear" the parts of words and is ready to learn to read Recognizes common plot structures Can visualize action in the story and hear the characters talking Enjoys sharing time with parents | Vocabulary not developed to same extent as peers |
| Parents and/or teachers continue reading aloud to child. All the results above continue for the child. Plus, as stories become more complex: New vocabulary words are learned and heard in context Can hear the tone of voice of characters and "see" action, as books have fewer and fewer pictures to provide visual clues Can put pieces of the story together and "see" the whole world of the story in his or her head Can become emotionally attached to the characters and the plot and care about how the story ends | Parents and teachers never read aloud to child. Results for the child: Frustration from coming across unfamiliar words Frustration from reading without "seeing" the action and the story |
| Teachers teach reading skills Child learns to: Decode sounds and parts of words Read aloud fluently Read for information Analyze content Answer questions about content | Teachers teach only reading skills Child learns to: Decode sounds and parts of words Read aloud Read for information Analyze content Answer questions about content See reading as just a string of words Have difficulty visualizing the whole context and keeping track of all the pieces See all reading as a pointless chore |
| Child becomes a balanced reader who can both enjoy reading and easily analyze content for information | Child avoids reading because it is "boring" and struggles when forced to read for information |

There exists a need for methods and specialized reading materials to address and provide a remedy for this imbalance in preparing students with the reading skills they will need in the $21^{st}$ Century. But first, some background.

Humans have been listening to stories for centuries and building images in their minds, as the story teller described the characters and the actions. The audiences could "see" the lazy hare napping on the side of the road, as the slow-moving tortoise passed him and won the race in Aesop's fable. They could visualize the many heads of the hissing Hydra serpent in Greek mythology, as Hercules tried to cut off its heads and two grew back for each one he cut-off. And, they delighted in the rolling words of the Prince in the Grimm's fairy tale, who ordered the girl locked in a tower, "Rapunzel, Rapunzel, let down your hair."

This ability to listen and build mental images based only on words has been lost in this technological age. Children who sit in front of TVs for hours have almost no ability to do this.

Because they miss this vital stage, they are lacking a necessary skill when they read words on a page. Also, because more and more effort is put into better and better images (i.e. HDTV) no one even recognizes how much this damages the child.

It is probably no accident that older adult readers are the most faithful readers of newspapers and say that reading a newspaper is a source of pleasure for them. They still remember the "Golden Age of Radio" when they heard stories on the radio night after night and had visual images of the Lone Ranger riding on his horse Silver, of Jack Benny crossing the moat in his basement to get money out of his vault, and of Fibber McGee opening his overstuffed closet and being hit on the head by all of the junk that fell out. Older readers had literally thousands of hours of practice in listening and visualizing—and keeping track of hundreds of characters and settings. When they read, they "see" and "hear" the action. Almost two generations have grown up without this experience and don't even know what they missed.

Modern technology has also provided "instant feedback" to children who, for example, can find answers on the internet with a few keystrokes or download a song or movie for entertainment. Books may seem too static and "slow" to such children. They look like too much work for a delayed reward. Which, on the surface, is true. But, by not reading, they are losing the experience of using their minds in a way that offers deeper rewards—emotionally and intellectually.

If no one reads stories to a child, he is missing a basic first step in reading. He can't imagine what is happening. He can't see the whole picture. Reading becomes an effort to decipher a bunch of phrases that lose meaning when no image is built in the mind. This is why good readers enjoy math story problems and poor readers fall apart when confronted with them. The good reader sees a story about a grocer who sells red apples for 15 cents apiece and green tomatoes for 10 cents apiece. He can imagine a buyer selecting the items and paying for them. The poor reader just sees numbers and the words "apples" and "tomatoes" and cannot see connections.

If a parent stops reading aloud when a child starts school and the child ends up in a classroom where the teacher never reads stories aloud, the child may fall behind as the assigned stories become more complex and no pictures are provided as clues. But, if a child can hear more complex stories read aloud to him, he can add each new character to a mental image and feel comfortable about keeping track of what happens. It is like he is building a movie in his head. (This is why very young children like to hear the same stories read to them over and over again. Each time the "movie" gets more detailed.)

There exists a need for methods and specialized reading materials to help the reader to get inside of a story by providing the reader with a listening experience to help them build the mental images and develop an emotional attachment to the story. Such methods and reading materials would advantageously provide a brief amount of background information. Brief amounts of background information would help the reader understand the context of the story and allow him to form opinions based only what he hears and later reads—just as the author intended.

There also exists a need for methods and specialized reading materials to put the author back in control of the story. Such methods and specialized reading materials would ideally reveal the setting, characters, and plot at the pace of the author's choosing. (Did Shakespeare ever imagine that characters like Falstaff would be sliced and diced in study guides, instead of simply enjoyed by the groundlings in the cheap seats in front of the stage at the Globe Theatre?)

One of the frustrations for reluctant readers is that they get overwhelmed by reading long paragraphs of introductory material and the introduction of numerous characters that may, or may not, be central to the story. They get lost in the first chapter and give up before they get hooked on the story and want to continue. So, they stop reading because the story is "boring." ("Boring" often means it is too hard to understand.) There exists a need for methods and specialized reading materials to help them to overcome that barrier.

A lot of money has been spent trying to interest reluctant readers in reading books, newspapers, and magazines. Children's books have glitzy covers and toys attached to them. Newspapers have improved graphics and design. Magazines have specialized to reach unique audiences. In all cases, content has often been simplified and shortened for quick reading. But, such cases fail to "literally" take the reader inside of the story and show him how pleasurable reading can be.

If more children became enthused about reading, like the millions of Harry Potter fans, it could revolutionize education in this country. Unfortunately, becoming Harry Potter fans, by and large, did not make such children readers of other books. Thus, there exists a need for methods and specialized reading materials to get fans of a particular series of books, such as the Harry Potter series, inside of other books. With such methods and specialized reading materials, fans of one series of books can learn to like the characters of other books as much as they enjoy the characters they are already familiar with, such as Harry Potter.

Enhanced interest in reading could revolutionize our economy as children succeed in school, learn to "turn on their imaginations," and create new ideas, products, and solutions to problems when they become adults.

Effective methods for mentally investing a reader in a reading material and specialized reading materials could be particularly helpful for at least two groups of children: (1) the children who were read to as children, but need a boost to try new and more difficult books on their own as they grow older (especially if no one is currently reading aloud to them); and (2) older children who used to love reading, but lost their enthusiasm by too much emphasis on reading skills and testing in the schools.

Properly designed methods for mentally investing a reader in a reading material and specialized reading materials could also be helpful for children who were never read to at an early age. For example, when someone starts to read to a child for the first time and awakens their imaginations, such methods and specialized reading material could be useful as a next step.

It is important to avoid using such methods and specialized reading materials in a manner that a child might perceive as being a test because an unintended result could arise. For example, researchers have found that children, who experience reading as nothing but a "test" of some kind, will see all reading as a test—even newspapers and works of fiction for leisure reading. This predisposition of reading as nothing but a test is advantageously avoided or reversed if already present. Children who become interested in a story, instead of seeing it as a test, will read the story even if it is above their normal reading grade level.

Finally, in an international reading test given to 15-year-olds from 32 developed nations in the year 2000, the U.S. was only average in reading skills. Academics who analyzed the results noted that good readers came from homes where books, newspapers, and magazines were plentiful and reading was valued. Also, the most "engaged" readers, the ones who read books, instead of just comic books, newspapers or magazine articles, were the most successful on the test. They suggested that if more children—especially boys—could become "engaged readers," who were passionate about reading, they would have better prospects for successful careers in the new global economy.

Thus, there is a pressing need for methods and specialized reading materials that help create engaged readers.

The following U.S. patents and patent application publications disclose methods, systems, and apparatuses relevant to hybrid reading materials and methods for mentally investing readers in reading materials: U.S. Pat. No. 5,963,916; 2007/0079383; 2007/0072162; 2006/0100924; 2005/0040639; 2004/0117728; and 2003/0117341. The listed references are hereby incorporated by reference, in their entireties, for all purposes.

SUMMARY

The present disclosure is directed to hybrid reading materials and methods for mentally investing readers in reading materials. Hybrid reading materials include text reciting written subject matter adapted to be read visually and an audio source operatively coupled to the text, the audio source including a memory device configured to store spoken presentation data, the spoken presentation data supplementing the text and being distinct from the written subject matter. Methods for mentally investing readers in reading materials include providing a reader with a summary document which summarizes aspects of the reading material and providing the reader with a spoken presentation of subject matter related to the reading material.

BRIEF DESCRIPTION OF THE DRAWINGS

FIG. 3 shows an example of a summary document according to the method of FIG. 1.

DETAILED DESCRIPTION

Methods for mentally investing a reader in a reading material 10 and hybrid reading materials 70 according to the present disclosure are described. The description is intended to provide examples of mental investment methods 10 and hybrid reading materials 70 according to the present disclosure; however, the mental investment methods 10 and hybrid reading materials 70 are not limited merely to the examples provided. Those skilled in the art will understand that many variations of the following examples may be utilized consistent with the present teachings.

Figure 1:
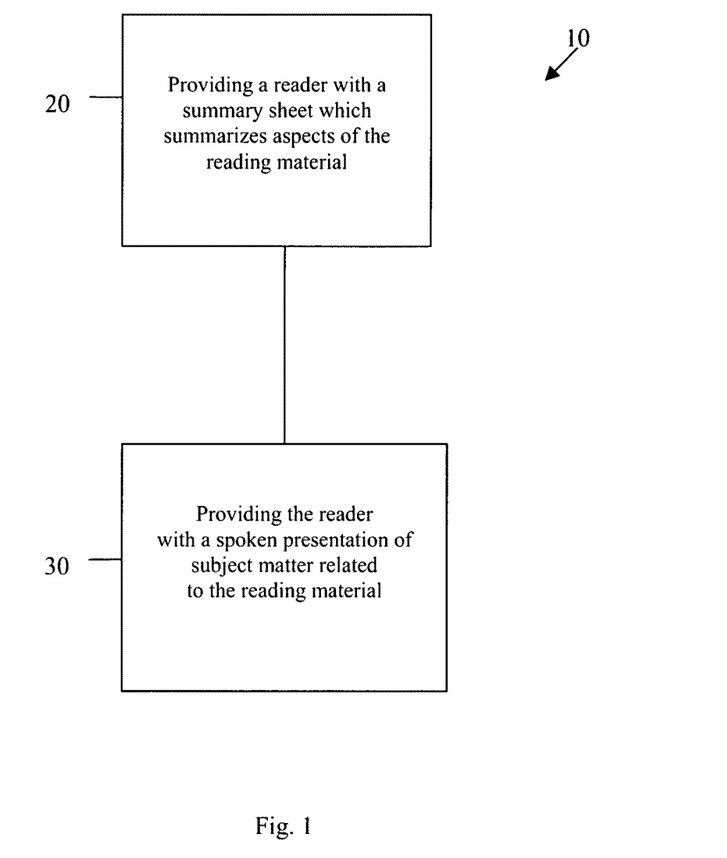
FIG. 1 schematically depicts a method for mentally investing a reader in a reading material according to the present disclosure.

As shown in FIG. 1, a method for mentally investing a reader in a reading material 10 typically includes providing a reader with a summary document 20 and providing the reader with a spoken presentation of subject matter related to the reading material 30. A reader is any person ranging from children to senior citizens. Reading materials may include fiction and non-fiction books, newspapers, magazines, and other periodicals. In some examples, reading materials include manuals and web pages.

Reading materials may be available online and in some examples are available online for a limited time. For example, the content of newspaper or magazine articles may be available online, in some instances freely available, for a number of weeks. After a certain time period, the reading material may be only available for a fee. Additionally or alternatively, print versions of the reading material may be available, such as from archives.

Mental investment method 10 may generate interest in the reading material that the reader would not otherwise have absent a mental investment in the reading material. Reading materials typically include abstract information. Some readers initially have difficulty "getting into" reading materials because they find it difficult to mentally process the abstract information. Readers sometimes find it difficult to relate to the abstract information, to use their imaginations to paint mental pictures of the abstract information, and/or to achieve an emotional response to the abstract information. Method 10 may assist a reader bridge the gap between merely perceiving the abstract content of a reading material and creating a mental picture of the information, which allows the reader to relate to the information and to have an emotional response. Thus, method 10 may provide a reader with newfound interest in a reading material, which may play a part in the reader's decision to read, purchase, or subscribe to the reading material.

Figure 2:
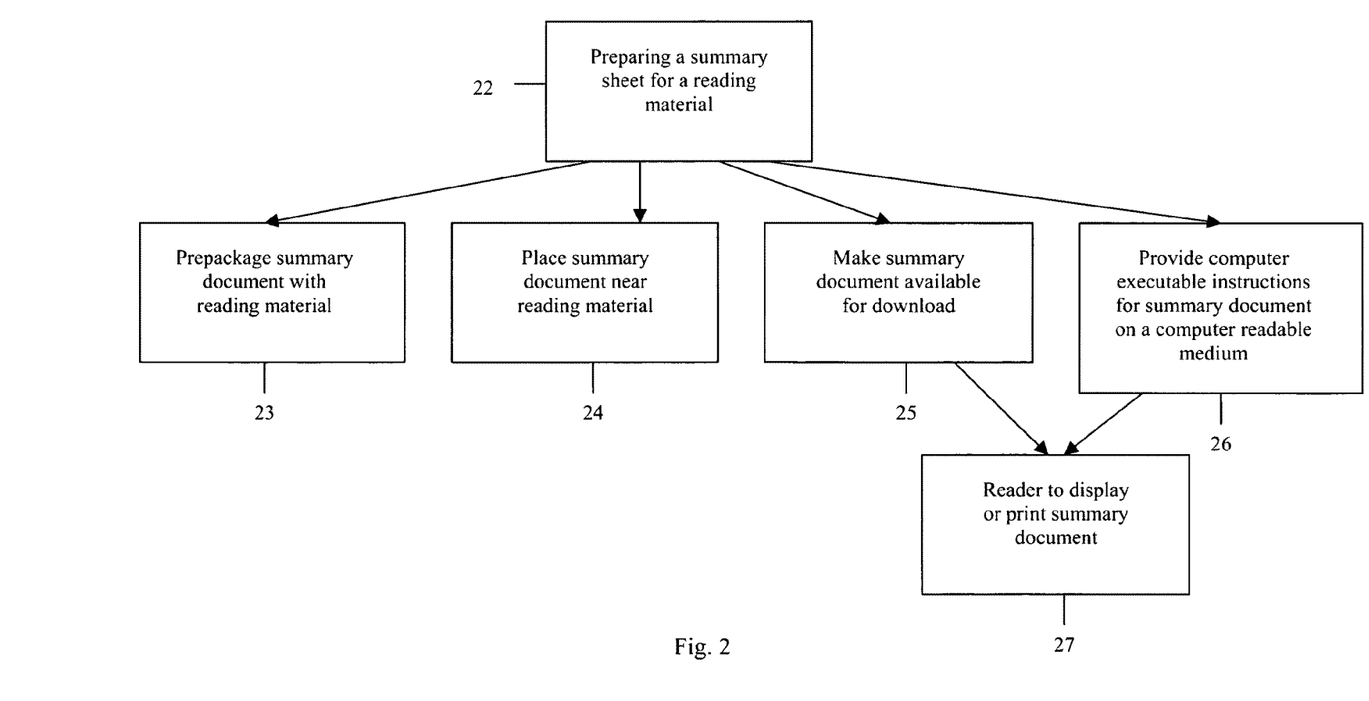
FIG. 2 schematically depicts an example of providing a reader with a summary document according to the method depicted in FIG. 1.

As shown in FIG. 2, providing a reader with a summary document 20 may include prepackaging a summary document with the reading material 23 or making the summary document otherwise available to the reader. For example, a plurality of summary documents may be placed near the reading material 24 for a user to take or purchase along with the reading material. In some examples, the reader may take or purchase the summary document independent of the reading material. Additionally or alternatively, the summary document may be available for download over the internet 25. The summary document may also be encoded onto a computer readable medium 26. Downloading 25 or encoding the summary document onto a computer readable medium 26 allows a reader to print the summary document from a computer or display the summary document on a display monitor 27.

Figure 4:
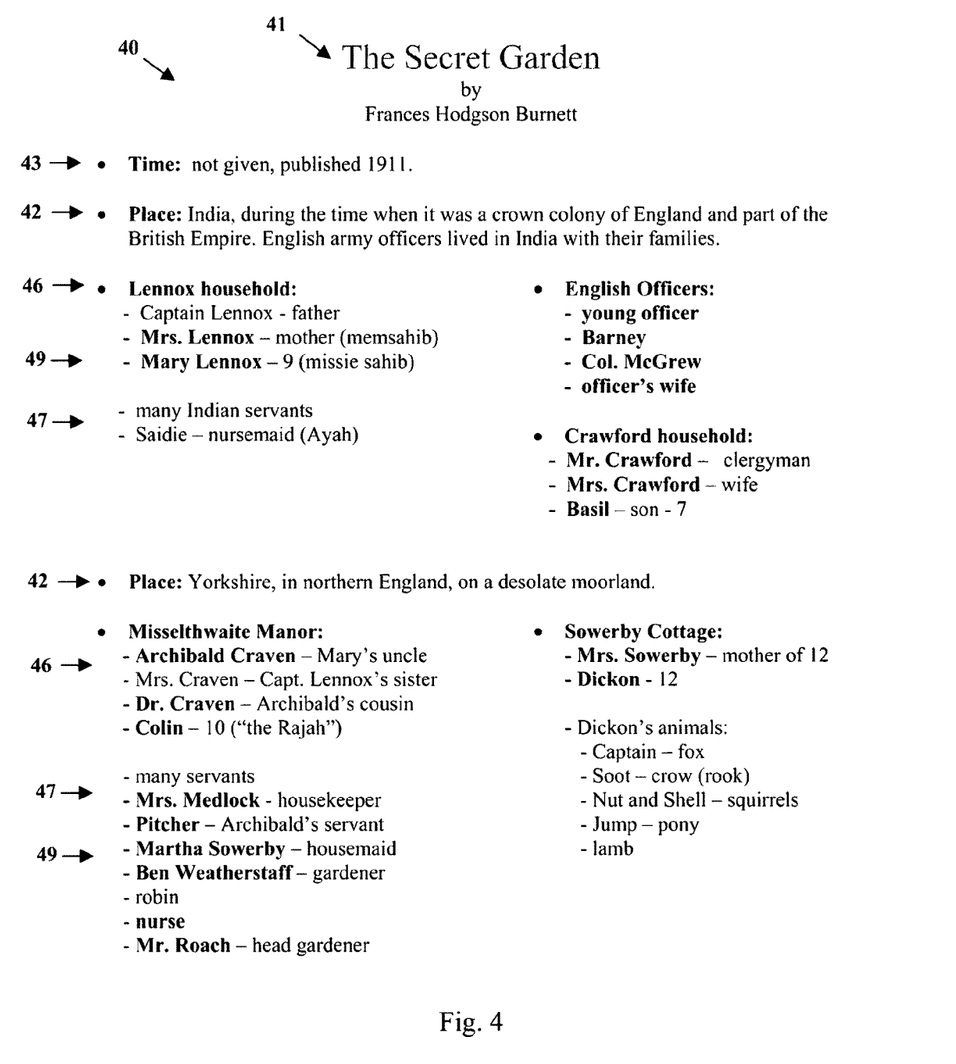
FIG. 4 shows another example of a summary document according to the method of FIG. 1.
Figure 5:
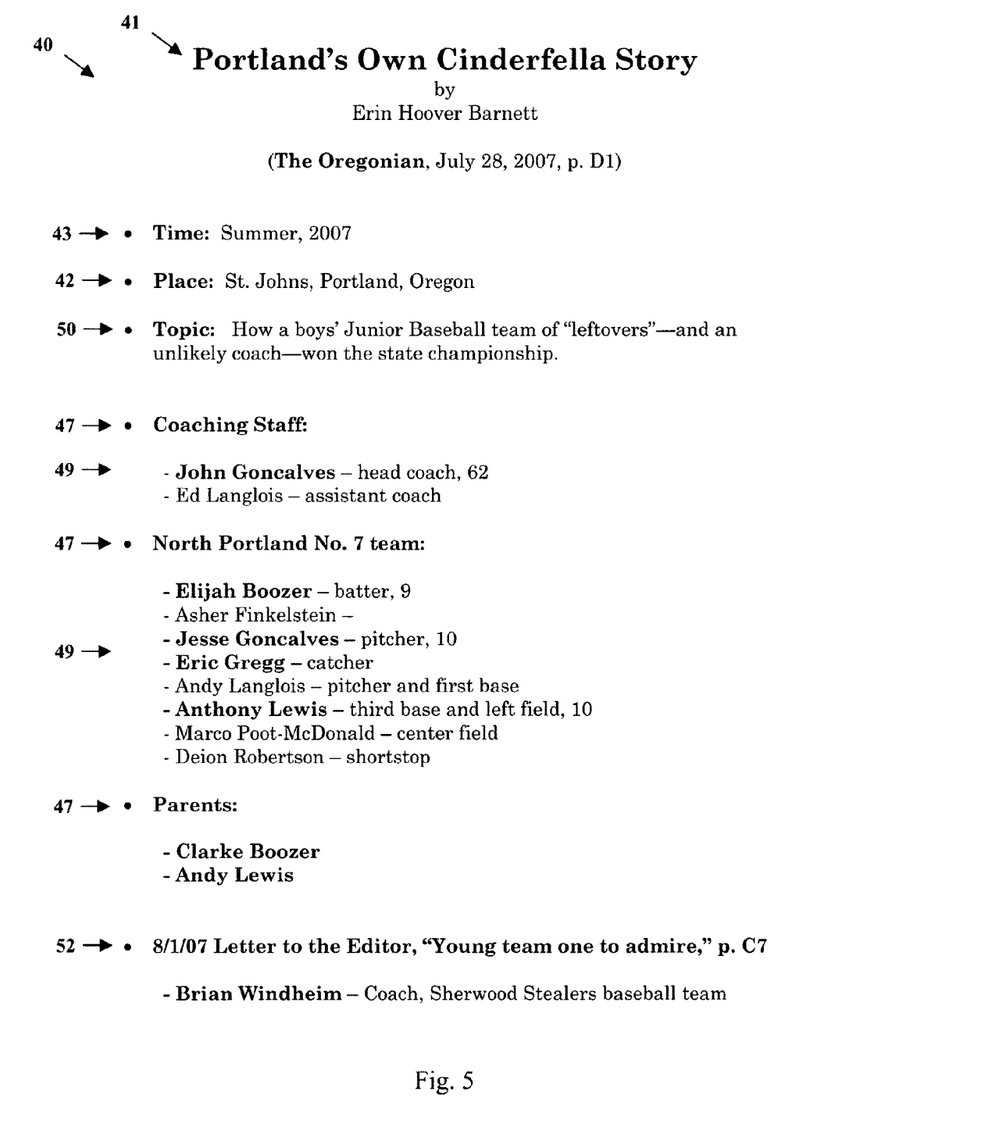
FIG. 5 shows a further example of a summary document according to the method of FIG. 1.

A summary document, shown generally at 40 in FIGS. 3-5, may summarize aspects of the reading material. For example, summary document 40 may provide the title and author of a reading material as shown at 41 in FIGS. 3-5. As shown at 42, summary document 40 may include a summary of the place in the story the reading material is set. The time in which the story of a reading material is set or takes place may be summarized, as indicated at 43 in FIGS. 3-5. Additionally or alternatively, the setting and/or narrator may be summarized, such as indicated at 44 and 45, respectively, in FIG. 3.

As shown at 46 in FIGS. 3-5, summary document 40 may list the names of persons or characters included in the reading material. In some examples, the list of persons or characters is organized by relationships the persons or characters have in the reading material, such as shown at 47 in FIGS. 3-5. Persons or characters who speak in the reading material may be indicated, such as by bolding, italicizing, highlighting, or underlining their names. Bolding the names of persons or characters who speak is shown generally at 49 in FIGS. 3-5.

As also shown in FIGS. 3-5, summary document 40 may entail a brief, one page, non-narrative summary of the reading material. Bullet points and tabular information may be used in contrast to the narrative summaries or "teasers" typically found on the inside or back covers of books. Structuring the content of summary document 40 may be used to organize the content. For example, grouping and indentation is used in FIGS. 3-5, generally at 47, to organize characters by the relationships they have or families to which they belong. Additionally, FIG. 3 demonstrates division of character groups, which is shown generally at 48, to further differentiate the characters by an attribute relevant to the story, in this case the skin color of the characters.

As shown in FIG. 5, summary document 40 may summarize a newspaper article. The topic of the article may be briefly summarized, such as shown generally at 50, to quickly orient a reader as to the article's content. Related content, such as published editorials or opinions regarding the article in question, may be referenced and summarized on summary document 40.

Providing a reader with a spoken presentation of subject matter related to the reading material 30 may occur before, after, or concurrently with providing the reader with a summary page 20. A spoken presentation is typically a speech, an out loud reading, or other form of auditory communication. The length of the spoken presentation may be selected to assist the reader become mentally invested in the reading material. For example, a spoken presentation of not more than 45 minutes may be selected. Additionally or alternatively, a spoken presentation of between 15 and 45 minutes may be selected. In some examples, a spoken presentation of at least 15 minutes is selected.

Different types, volumes, and rates of speech may be used for the spoken presentation. For example, a dramatic type of speech in which the speaker varies his or her tone when speaking may be used in contrast to a monotone type of speech. The volume of speech may be varied for emphasis, to make the spoken presentation more interesting to the reader, to accommodate the hearing abilities of the reader, and/or to create an environment conducive to comprehension.

Additionally or alternatively, the rate of speech may be varied for emphasis, to make the spoken presentation more interesting to the reader, to accommodate the comprehension abilities of the reader, or to provide a calming environment where the spoken presentation can be enjoyed by the reader. For example, a spoken presentation provided at a rate of not more than 160 words per minute may assist some readers, such as younger or inexperienced readers, comprehend the spoken presentation. Rates of speech between 90 and 250 words per minute may be appropriate in different circumstances.

The spoken presentation may be of various subject matter related to the reading material. The subject matter may be selected portions of the reading material itself; the spoken presentation thus including reading the selected portions of the reading material out loud. For example, the subject matter may be the first 15, 30, 45, 60, etc. pages of the reading material. The subject matter may be a given number of pages of the reading material, consecutive or non-consecutive, such that the spoken presentation requires approximately 15 minutes or more and/or 45 minutes or less to complete.

In examples where the reading material is a newspaper, magazine, or other periodical, the subject matter of the spoken presentation may be a collection of articles of the reading material. The subject matter may be past or current articles of the reading material. The articles may be selected to have a common theme or a varied theme. The articles may be selected based on popularity, quality of writing, or importance of the underlying issue. In general, the collection of articles are typically selected to generate interest in the reading material. By being exposed to articles by hearing them read aloud, readers may procure an interest in regularly reading the reading material, purchasing the reading material, or subscribing to the reading material.

Figure 6:
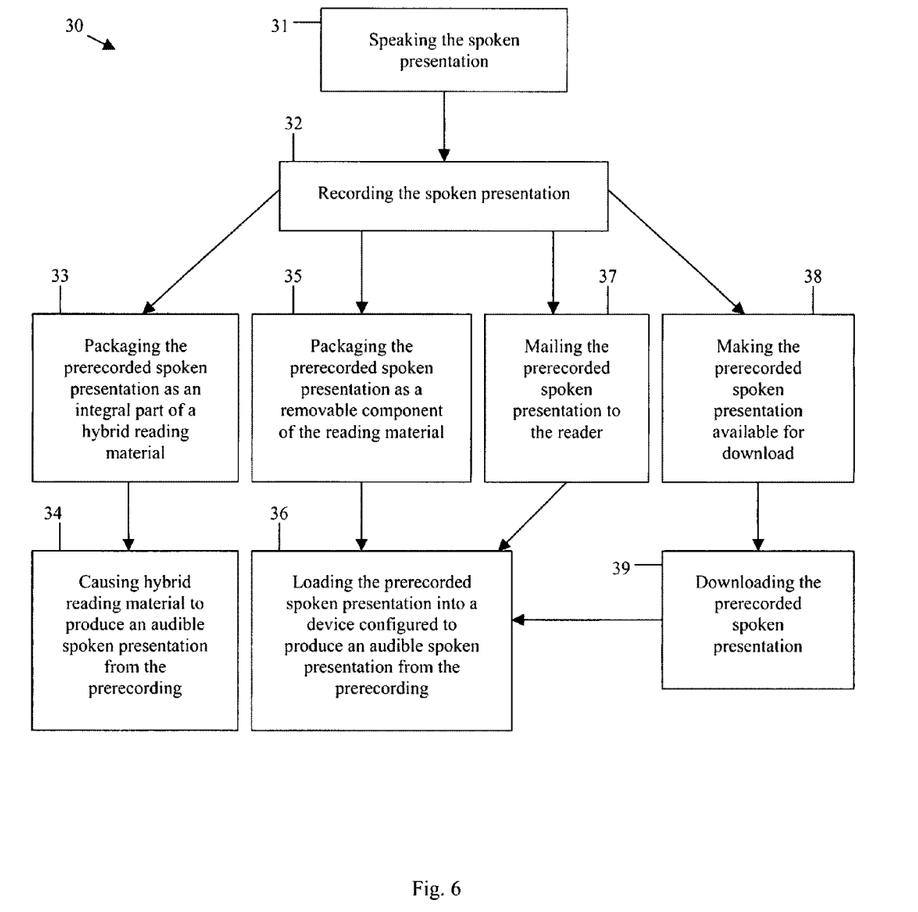
FIG. 6 schematically depicts providing a reader with a spoken presentation according to the method depicted in FIG. 1.

As shown in FIG. 6, providing a reader with a spoken presentation 30 typically starts with speaking the spoken presentation 31. A human or machine may "speak" the spoken presentation. In some examples, the spoken presentation is recorded 32 and the reader is provided with the recorded spoken presentation. The spoken presentation may be recorded onto a tape, CD, or any form of computer readable medium. In other examples, the spoken presentation is performed live and/or in person to a reader.

As shown in FIG. 6, providing the reader with the recorded spoken presentation may occur in multiple ways. For instance, the recorded spoken presentation may be packaged as an integral part of a hybrid reading material 33. One example of a hybrid reading material is a reading material including text and an audio source adapted to produce an audible spoken presentation from the recorded spoken presentation. The reader may then selectively cause a hybrid reading material to produce an audible spoken presentation 34. Further examples of hybrid reading materials are provided below.

Additionally or alternatively, the recorded spoken presentation may be packaged as a removable component of the reading material 35. In this example, the reader may load the recorded spoken presentation onto a device configured to produce an audible spoken presentation from the recording 36. For instance, suitable devices include computers and music reproduction devices, for instance, tape decks, CD players, walkmans, iPods, and the like.

In some examples, the recorded spoken presentation is mailed to the reader 37 and/or made available for download 38. Whether received by mail or downloaded, the reader may similarly load the recorded spoken presentation onto a device configured to produce an audible spoken presentation from the recording 36. In some instances, the recorded spoken presentation may correspond to a reading material available online. In one example, a reader downloads or receives a spoken presentation by mail along with instructions for freely accessing the reading material online, such as online versions of print newspaper or magazine articles. The reading material corresponding to the spoken presentation may be freely available online for a limited time, such as a number of weeks, and then made available for a fee thereafter. In some examples, related reading material, such as current articles may be available for subscription or a fee.

The spoken presentation may be made available to a reader wholly separate from a reading material. Mental investment method 10 may include identifying and/or correlating reading materials related to the spoken presentation made separately available. For example, a spoken presentation may include a spoken presentation of past articles of a newspaper or magazine and it may be made separately available to readers as a marketing tool. For example, a reader may listen to the spoken presentation of past articles and determine that reading or subscribing to the newspaper or magazine at issue for current articles would be worthwhile.

Similarly, spoken presentations of books may be made available to readers apart from the book itself. The spoken presentation of a portion of the book may encourage readers to read or purchase the book. Additionally or alternatively, spoken presentations of portions of past books by an author made available separate from a current book may facilitate marketing of a current book. In some examples, a spoken presentation of stories similar to a book may encourage readers to read or purchase a book in question.

Figure 7:
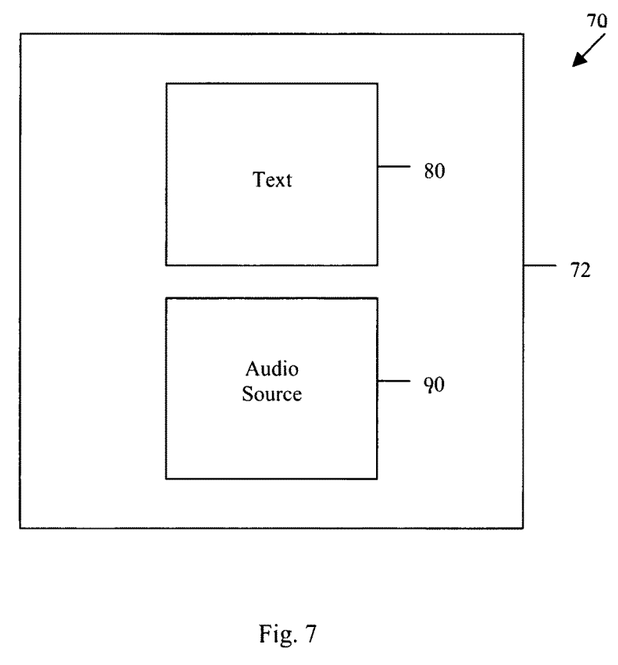
FIG. 7 conceptually depicts a hybrid reading material according to the present disclosure.

A hybrid reading material 70 according to the present disclosure may include text 80 and an audio source 90 operatively connected to text 80. As shown in FIG. 7, hybrid reading material 70 may be a hybrid book. Hybrid reading material 70 may include a cover 72 supporting text 80 and supporting audio source 90. Hybrid reading material 70 typically combines visual reading and an auditory listening experience into a hybrid story or reading experience. A hybrid story or reading experience combining visual reading and auditory listening may assist a reader become mentally invested in text 80.

Cover 72 is not included in all examples of hybrid reading material 70. For example, when hybrid reading material 70 is a hybrid newspaper, cover 72 is not included. In this instance, audio source 90 is either attached to text 80 or packaged with text 80. For example, audio source 90 may be included inside an inner fold of the newspaper text 80, enclosed in plastic wrap also enclosing newspaper text 80, or inserted inside a bag containing newspaper text 80.

In examples of hybrid reading material where cover 72 is included, such as with hybrid books and hybrid magazines, cover 72 may take many forms. In examples where hybrid reading material 70 is a hybrid book, cover 72 may be a hard cover or a soft cover as with conventional books. In examples where hybrid reading material is a hybrid magazine, cover 72 is typically a paper cover as with conventional magazines.

Text 80 is typically includes pages of written subject matter adapted to be read visually. Additionally or alternatively, text 80 may include brail characters or cells adapted to be read by touch. In some examples, text 80 includes text displayed on a computer screen. Text 80 may also include pictures.

Text 80 may represent a portion of a complete story or work, such as a nonfiction or technical work. In some examples, text 80 is the middle and end of a story or work and does not include the beginning of the story or work. In other examples, text 80 is the beginning of a story or work and does not include the middle and the end. Text 80 may include an the entire story or work.

Figure 8:
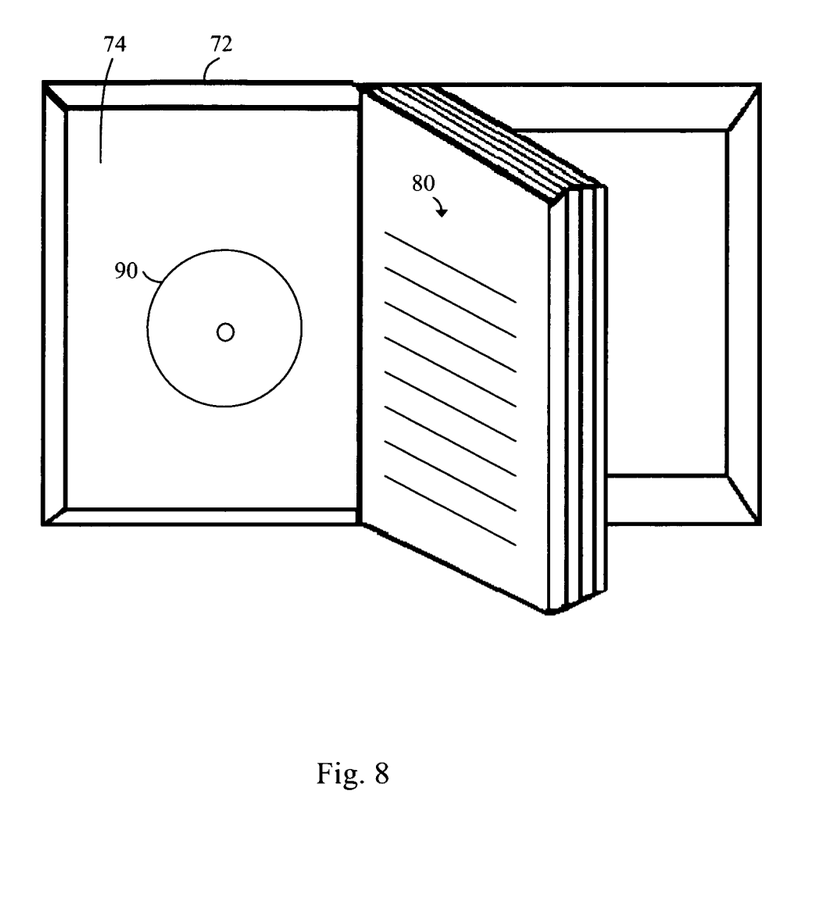
FIG. 8 shows an example of the hybrid reading material of FIG. 7.
Figure 9:
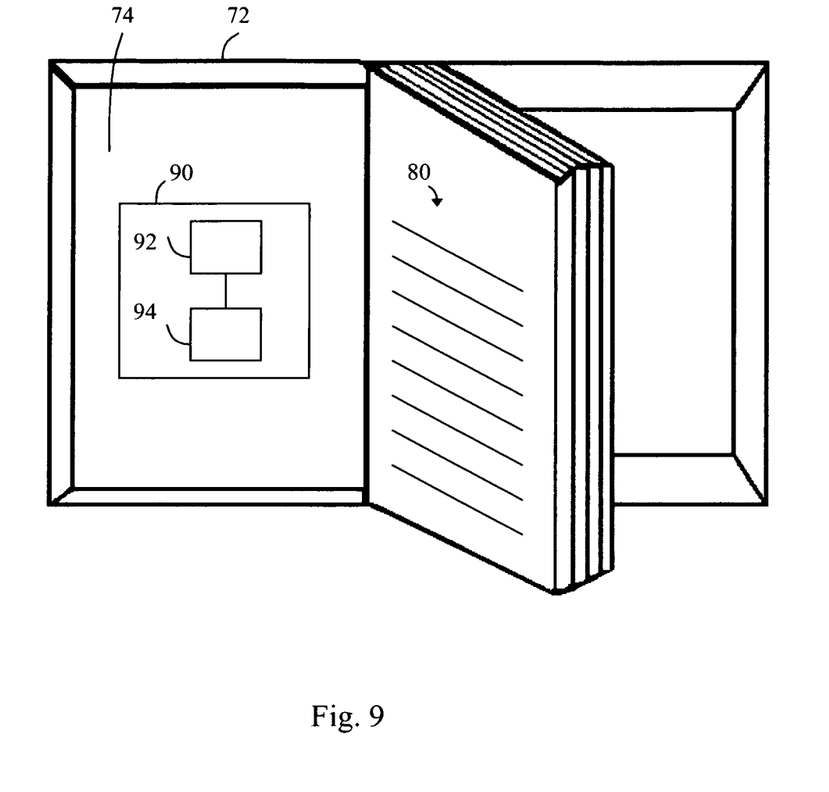
FIG. 9 shows another example of the hybrid reading material of FIG. 7.

Audio source 90 may be operatively coupled to text 80. In some examples, audio source 90 is supported by cover 72, which also supports text 80. For instance, audio source 90 may be attached to an inside 74 of cover 72. Audio source 90 may also be attached to an outside (not pictured) of cover 72. Audio source 90 may be releasably secured to cover 72, such as shown in FIG. 8, or it may be fixedly secured to cover 72, such as shown in FIG. 9. In some examples, audio source 90 is releasably or fixedly coupled directly to text 80.

Audio source 90 may include a memory device 92 configured to store spoken presentation data. Spoken presentation data may supplement the text and be distinct from the written subject matter. Distinct in this context is intended to mean that the spoken presentation data does not overlap the written subject matter. For instance, the spoken presentation data may include a person reading a first portion of a story and the written subject matter may provide the remainder of the story, starting only where the spoken presentation data leaves off. In other examples, the written subject matter recites the entire story or work and the spoken presentation data introduces the story or work, such as by providing background and useful information to put the story or work in context.

Memory device 92 may be a computer readable medium, such as a diskette, a cassette tape, a compact disk, a digital video disk, a memory card, a hard drive, or a flash drive. In some examples, memory device 92 is removable from text 80 and, in other examples, it is fixed to cover 72 or text 80. In examples where memory device 92 is removable, memory device 92 is typically adapted to operatively couple with an external sound or audio production mechanism (not pictured). External sound production mechanism is typically configured to read the stored spoken presentation data and to use the data to produce an audible spoken presentation for a reader.

Audio source 90 may include an audio production mechanism 94 configured to make audible the spoken presentation data. Typically, audio production mechanism 94 is operatively connected to memory device 92 and fixedly secured to cover 72 or text 80. However, in some examples audio production mechanism 94 may be removed from cover 72 or text 80. Audio production mechanism 94 may include any conventional audio production component, such as sound boards, processors, amplifiers, power supplies, and speakers. Any conventional audio production mechanism may be used and relatively compact and inexpensive audio production mechanisms may be especially suited for inclusion in hybrid reading material 70.

While embodiments of hybrid reading materials and methods for mentally investing readers in reading materials have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed.

Where "a" or "a first" element or the equivalent thereof is recited, such recitations include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Inventions embodied in various combinations and subcombinations of features, functions, elements, and/or properties may be claimed through presentation of claims in a related application. Such claims, whether they are directed to different inventions or directed to the same invention, whether different, broader, narrower or equal in scope to the other claims, are also regarded as included within the subject matter of the present disclosure.

I claim:

1. A method for mentally investing a reader in a story comprising:
   providing the reader with a hybrid book comprising the story, the hybrid book including:
      pages of text embodying a text portion of the story,
      a computer readable medium with stored spoken presentation data corresponding to an audible portion of the story, the audible portion being wholly distinct from the text portion of the story, and
      an audio device configured to make audible the spoken presentation data;
   providing the reader with a summary document which summarizes aspects of the story, the summary document including at least a partial list of people, animals, or creatures discussed in the story; and
   making audible the stored spoken presentation date, with the audio device after the reader has received the summary document and prior to the reader reading the pages of text embodying the text portion of the story,
   wherein the audible portion represents a beginning portion of the story and corresponds to a given number of pages of text omitted from the text portion of the story.

2. The method of claim 1, wherein the audible portion is between 15 and 45 minutes.

3. The method of claim 1, wherein the audible portion corresponds to a first 30 pages of text omitted from the text portion.

4. The method of claim 1, wherein the audible portion corresponds to a given number of pages of text omitted from the text portion requiring not more than 45 minutes to provide the audible portion.

5. The method of claim 3, wherein the audible portion corresponds to a given number of pages of text omitted from the text portion requiring not less than 15 minutes to pros tree v e stored spoken presentation.

6. The method of claim 3, wherein the stored spoken presentation is spoken at a pace selected to be not more than 160 words per minute.

7. The method of claim 1, wherein the summary document includes a description of the partial list of people, animals, or creatures discussed in the story.

8. The method of claim 7, wherein the partial list of people, animals, or creatures discussed in the story are organized by the relationships between them in the story.

9. The method of claim 1, wherein the story is set in at least one time and place and the summary document summarizes the at least one time and place.

10. The method of claim 1, wherein the story, includes a narrator and the summary document identifies the narrator.

11. The method of claim 1, wherein the spoken presentation data includes a first subset of spoken presentation data recorded at a first rate of speech and a second subset of spoken present data recorded at a second rate of speech; and farther comprising:
    selecting between the first subset of spoken presentation data and the second subset of spoken presentation data to define a selected subset of spoken presentation data based on the rate of speech deemed suitable for the reader's ability to comprehend the story; and
    wherein making audible the stored presentation data includes making audible the selected subset of spoken presentation data.

12. A method for mentally investing a reader in a newspaper story comprising:
    providing the reader with a newspaper comprising the newspaper story, the newspaper including:
       pages of text embodying a text portion of the newspaper story,
       a computer readable medium with stored spoken presentation data corresponding to an audible portion of the newspaper story, the audible portion being wholly distinct from the text portion of the newspaper story, and
    an audio device configured to make audible the spoken presentation data;
    providing the reader with a summary document which summarizes aspects of the newspaper story, the summary document including at least a partial list of people, animals, or creatures discussed in the newspaper story; and
    making audible the stored spoken presentation data with the audio device after the reader has received the summary document and prior to the reader reading the pages of text embodying the text portion of the newspaper story,
    wherein the audible portion represents a beginning portion of the newspaper story and corresponds to a given number of pages of text omitted from the text portion of the newspaper story.

* * * * *